United States Patent
Wang

(10) Patent No.: US 11,073,922 B2
(45) Date of Patent: Jul. 27, 2021

(54) MOUSE

(71) Applicant: Chicony Electronics Co., Ltd., New Taipei (TW)

(72) Inventor: Yi-Hung Wang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/540,077

(22) Filed: Aug. 14, 2019

(65) Prior Publication Data

US 2020/0333892 A1    Oct. 22, 2020

(30) Foreign Application Priority Data

Apr. 17, 2019   (TW) ................................ 108113449

(51) Int. Cl.
*G06F 3/0354* (2013.01)
*G06F 3/039* (2013.01)
*G06F 3/01* (2006.01)

(52) U.S. Cl.
CPC .......... *G06F 3/03543* (2013.01); *G06F 3/016* (2013.01); *G06F 3/039* (2013.01); *G06F 2203/0333* (2013.01)

(58) Field of Classification Search
None
See application file for complete search history.

(56) References Cited

U.S. PATENT DOCUMENTS

| | | | | |
|---|---|---|---|---|
| 6,304,249 B1* | 10/2001 | Derocher | .............. | G06F 1/1616 248/118.1 |
| 6,924,787 B2* | 8/2005 | Kramer | .................. | G06F 3/016 345/156 |
| 6,970,156 B1* | 11/2005 | Silverstein | .......... | G06F 3/03543 345/156 |
| 7,109,972 B2* | 9/2006 | Fu | ........................... | G06F 3/033 345/156 |
| 7,362,309 B2* | 4/2008 | Chao | .................... | G06F 3/03543 345/164 |
| 10,592,008 B1* | 3/2020 | Wang | ...................... | G06F 3/016 |
| 2002/0054060 A1* | 5/2002 | Schena | .................. | G05G 9/047 715/701 |

(Continued)

FOREIGN PATENT DOCUMENTS

| CN | 102939570 A | 2/2013 |
|---|---|---|
| TW | 201913307 A | 4/2019 |

OTHER PUBLICATIONS

Kruusamae et al, Self-sensing Ionic Polymer Actuators: A Review, Actuators 2015, Mar. 2015, pp. 17-38 (Year: 2015).*

*Primary Examiner* — Dorothy Harris
(74) *Attorney, Agent, or Firm* — CKC & Partners Co., LLC

(57) ABSTRACT

A mouse includes a button portion and a deformable holding portion. The button portion has an upper housing and a lower housing. The upper housing is assembled to the lower housing. The deformable holding portion is connected to the button portion and includes at least one electroactive material layer and a flexible material layer. The flexible material layer covers the electroactive material layer. When the electroactive material layer is in an energized state, the deformable holding portion has a first shape. When the electroactive material layer is in an unenergized state, the deformable holding portion has a second shape.

8 Claims, 8 Drawing Sheets

(56) References Cited

U.S. PATENT DOCUMENTS

| | | | | |
|---|---|---|---|---|
| 2005/0122312 A1* | 6/2005 | Huang | ............... | G06F 3/03543 |
| | | | | 345/163 |
| 2006/0022943 A1* | 2/2006 | Johnson | ................ | G06F 1/169 |
| | | | | 345/157 |
| 2006/0176277 A1* | 8/2006 | Daniel | ................ | G06F 3/0317 |
| | | | | 345/163 |
| 2006/0250366 A1* | 11/2006 | Shigeno | ............. | G06F 3/03543 |
| | | | | 345/163 |
| 2010/0053084 A1* | 3/2010 | Chatterjee | .......... | G06F 3/03543 |
| | | | | 345/163 |
| 2010/0283731 A1* | 11/2010 | Grant | ..................... | G06F 3/016 |
| | | | | 345/158 |
| 2012/0032884 A1* | 2/2012 | Lee | .................... | G06F 3/03543 |
| | | | | 345/163 |
| 2012/0169600 A1* | 7/2012 | Ma | ..................... | G06F 3/03543 |
| | | | | 345/163 |
| 2012/0235911 A1* | 9/2012 | Snyder | ............... | G06F 3/03541 |
| | | | | 345/163 |
| 2013/0027864 A1* | 1/2013 | Wei | .................... | G06F 3/03547 |
| | | | | 361/679.08 |
| 2014/0267040 A1* | 9/2014 | Theytaz | ................. | G06F 3/039 |
| | | | | 345/163 |
| 2016/0209941 A1* | 7/2016 | Hadas | ................. | G06F 3/03543 |
| 2016/0334865 A1* | 11/2016 | Siegfried | ............. | B29C 61/10 |
| 2018/0341345 A1* | 11/2018 | Streltsov | ............ | G06F 3/03543 |
| 2019/0056804 A1* | 2/2019 | Chang | .................. | G06F 3/038 |

* cited by examiner

MOUSE

CROSS-REFERENCE TO RELATED APPLICATION

This application claims priority to Taiwan Application Serial Number 108113449, filed Apr. 17, 2019, which is herein incorporated by reference in its entirety.

BACKGROUND

Technical Field

The present disclosure relates to a mouse.

Description of Related Art

Due to the convenience of computer devices, it is typical for people to rely upon computer devices for production or leisure activities nowadays. When a user uses a computer device, a mouse is an indispensable control device or an input device. While the user is working, playing games or shopping online, a mouse is generally required to complete the above activities.

However, a mouse used nowadays is often limited by the design of materials and mechanisms, and cannot meet the many of the needs of different users.

SUMMARY

The present disclosure provides a mouse used to meet the needs of different users. The mouse includes a button portion and a deformable holding portion. The button portion has an upper housing and a lower housing. The upper housing is assembled to the lower housing. The deformable holding portion is connected to the button portion and includes at least one electroactive material layer and a flexible material layer. The flexible material layer covers the electroactive material layer. When the electroactive material layer is in an energized state, the deformable holding portion has a first shape. When the electroactive material layer is in an unenergized state, the deformable holding portion has a second shape.

According to some embodiments of the present disclosure, the deformable holding portion has a palm supporting area. The electroactive material layer is disposed in the palm supporting area. When the electroactive material layer is in the energized state, the electroactive material layer is bent toward the lower housing. When the electroactive material layer is in the unenergized state, the electroactive material layer has a flat plate shape.

According to some embodiments of the present disclosure, the electroactive material layer has a first electrode, a second electrode, and an electrically actuated material disposed between the first electrode and the second electrode.

According to some embodiments of the present disclosure, the first electrode is a positive electrode, and the first electrode is closer than the second electrode to the lower housing.

According to some embodiments of the present disclosure, the electrically actuated material is an ionic polymer-metal composite (IPMC).

According to some embodiments of the present disclosure, the deformable holding portion includes two of the electroactive material layers disposed in parallel, and one of the two electroactive material layers is closer than the other of the two electroactive material layers to the lower housing.

According to some embodiments of the present disclosure, the deformable holding portion has a palm supporting area and a finger-gripping area on one side of the palm supporting area, and the electroactive material layer is disposed in the finger-gripping area.

According to some embodiments of the present disclosure, the electroactive material layer has an electroactive material and a substrate, and the substrate of the electroactive material layer is closer than the electroactive material to the palm supporting area.

According to some embodiments of the present disclosure, the upper housing has a first button and a second button, and the deformable holding portion has a palm supporting area and a first finger-gripping area and a second finger-gripping area respectively disposed on two sides of the palm supporting area. The mouse includes two of the electroactive material layers respectively disposed in the first finger-gripping area and the second finger-gripping area of the deformable holding portion. The mouse further includes a change-over switch. The change-over switch is selectively electrically connected to the electroactive material layer in the first finger-gripping area, and the change-over switch is selectively electrically connected to the electroactive material layer in the second finger-gripping area.

According to some embodiments of the present disclosure, when the change-over switch is in a first mode, the electroactive material layer in the first finger-gripping area and the electroactive material layer in the second finger-gripping area are respectively aligned with a first outer edge of the first button and a second outer edge of the second button.

According to some embodiments of the present disclosure, when the change-over switch is in a second mode, the electroactive material layer in the first finger-gripping area protrudes from the first outer edge of the first button, and the electroactive material layer in the second finger-gripping area is aligned with the second outer edge of the second button.

According to some embodiments of the present disclosure, when the change-over switch is in a third mode, the electroactive material layer in the first finger-gripping area is aligned with the first outer edge of the first button, and the electroactive material layer in the second finger-gripping area protrudes from the second outer edge of the second button.

In summary, the disclosure provides the mouse having the button portion and the deformable holding portion. The deformable holding portion includes the electroactive material layer and the flexible material layer. When the electroactive material layer is in the energized state, the deformable holding portion has the first shape. When the electroactive material layer is in the unenergized state, the deformable holding portion has the second shape. By using the above-mentioned mouse, the user can easily control the mouse, thereby meeting the needs of different users.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
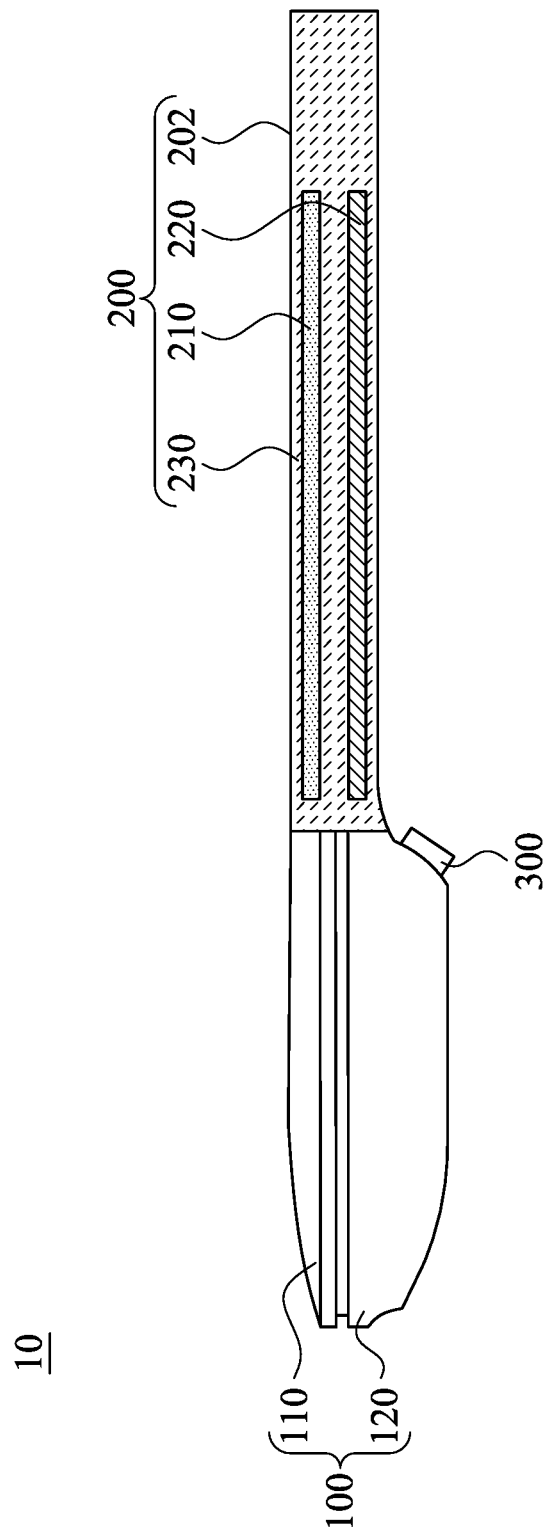
FIG. 1 is a schematic side view of a mouse in one operating state in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
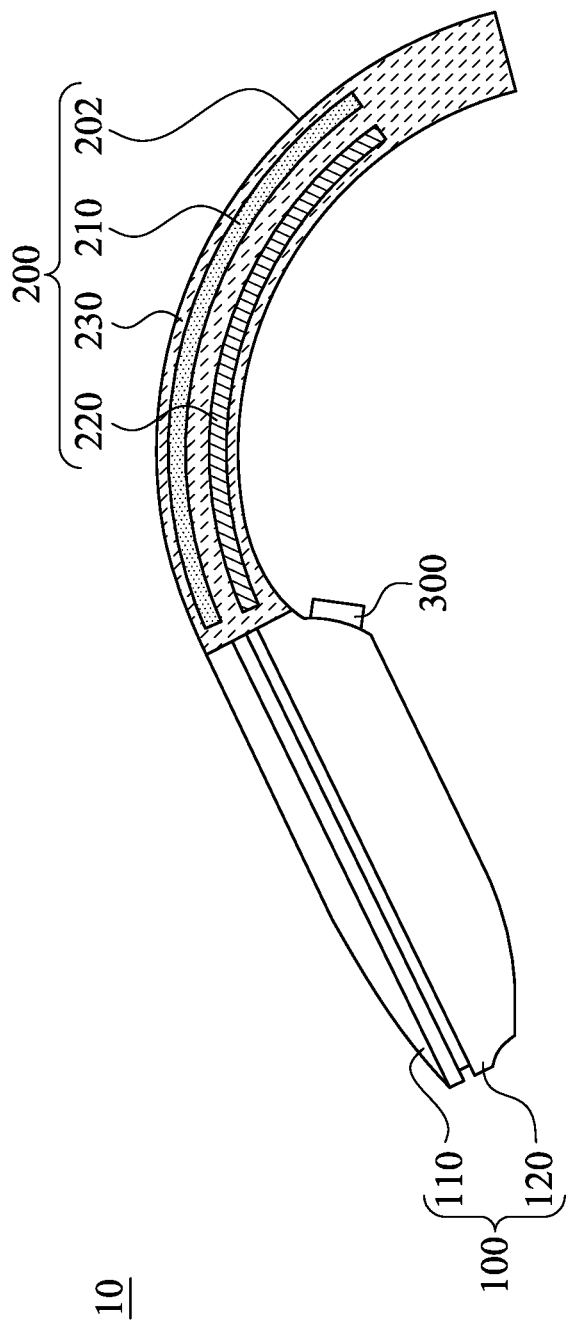
FIG. 2 is a schematic side view of the mouse in another operating state in accordance with one embodiment of the present disclosure.

Referring to FIG. 1 and FIG. 2, FIG. 1 is a schematic side view of a mouse 10 in one operating state in accordance with one embodiment of the present disclosure, while FIG. 2 is a schematic side view of the mouse 10 in another operating state in accordance with one embodiment of the present disclosure. The mouse 10 includes a button portion 100 and a deformable holding portion 200. The button portion 100 has an upper housing 110 and a lower housing 120. The upper housing 110 is assembled to the lower housing 120. The deformable holding portion 200 is connected to the button portion 100. The deformable holding portion 200 includes a first electroactive material layer 210, a second electroactive material layer 220, and a flexible material layer 230. The flexible material layer 230 covers the first electroactive material layer 210 and the second electroactive material layer 220.

The first electroactive material layer 210 and the second electroactive material layer 220 may be activated by electrical energy. When the first electroactive material layer 210 and the second electroactive material layer 220 are in an energized state, the deformable holding portion 200 has a first shape. When the first electroactive material layer 210 and the second electroactive material layer 220 are in an unenergized state, the deformable holding portion 200 has a second shape. For example, as shown in FIG. 2 of the mouse 10 in one operating state, when the first electroactive material layer 210 and the second electroactive material layer 220 are in the energized state, the deformable holding portion 200 of the mouse 10 has a curved shape. As shown in FIG. 1 of the mouse 10 in another operation state, when the first electroactive material layer 210 and the second electroactive material layer 220 are in the unenergized state, the deformable holding portion 200 of the mouse 10 has a flat plate shape.

In some embodiments, the first electroactive material layer 210 and the second electroactive material layer 220 are disposed in parallel, and the second electroactive material layer 220 is closer than the first electroactive material layer 210 to the lower housing 120. The material of the first electroactive material layer 210 may be the same as that of the second electroactive material layer 220. The first electroactive material layer 210 and the second electroactive material layer 220 may each include two electrodes and an electrically actuated material disposed between the two electrodes. The electrically actuated material may be deformed due to energization, such as being bent. The electrically actuated material may be electroactive polymers (EAP). In some embodiments, the electrically actuated material may be ionic polymer-metal composites (IPMC).

The flexible material layer 230 covers the first electroactive material layer 210 and the second electroactive material layer 220 to achieve better using feel of the user and to protect the first electroactive material layer 210 and the second electroactive material layer 220. In some embodiments, the flexible material layer 230 may be a rubber, other elastic polymeric materials, or other soft materials.

Referring to FIG. 2, when the first electroactive material layer 210 and the second electroactive material layer 220 are in the energized state, e.g., the switch of the mouse 10 is in a turned-on state or the mouse 10 is connected to the computer, the first electroactive material layer 210 and the second electroactive material layer 220 are bent toward the lower housing 120 and form the curved shape. Furthermore, since the flexible material layer 230 covers the first electroactive material layer 210 and the second electroactive material layer 220, the first electroactive material layer 210 and the second electroactive material layer 220 are changed from the flat plate shape to the curved shape, thereby causing the flexible material layer 230 to change from the flat plate shape to the curved shape. At this time, when the user operates the mouse 10, the curved deformable holding portion 200 may be attached to the palm of the user, thereby improving the user's experience of operating the mouse 10.

On the other hand, when the first electroactive material layer 210 and the second electroactive material layer 220 are in the unenergized state, e.g., the switch of the mouse 10 is in a turned-off state or the mouse 10 is disconnected from the computer, the first electroactive material layer 210 and the second electroactive material layer 220 may be changed back to the flat plate shape from the curved shape. Since the flexible material layer 230 covers the first electroactive material layer 210 and the second electroactive material layer 220, the first electroactive material layer 210 and the second electroactive material layer 220 are changed from the curved shape to the flat plate shape, thereby causing the flexible material layer 230 to change from the curved shape to the flat plate shape. At this time, the deformable holding portion 200 having the flat plate shape causes the mouse 10 to occupy a smaller space, which is convenient for the user to carry the mouse 10.

Figure 3A:
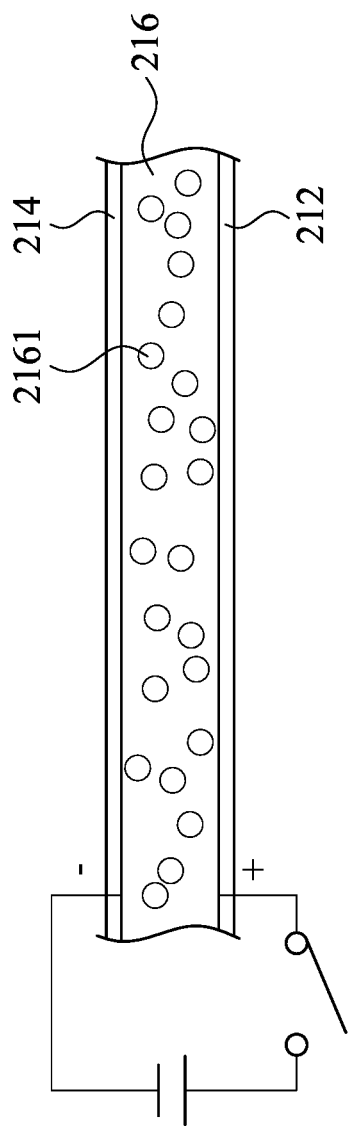
FIG. 3A and FIG. 3B are schematic views of an electrically actuated material in different operating states in accordance with one embodiment of the present disclosure.
Figure 3B:
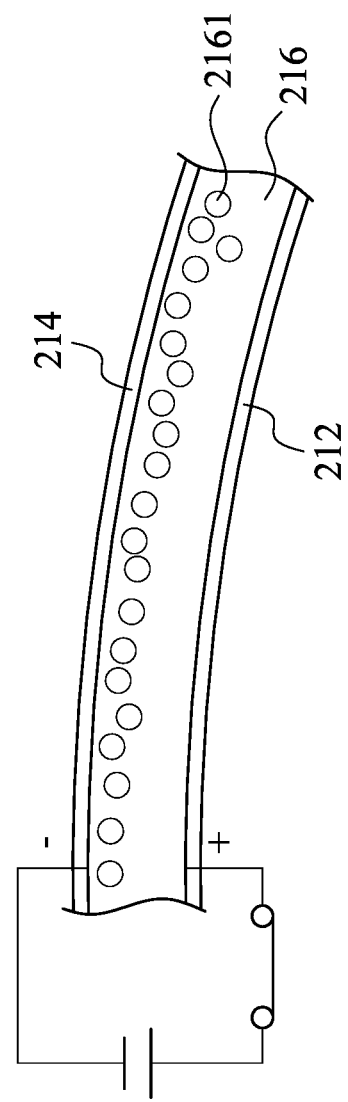

Referring to FIG. 3A and FIG. 3B, FIG. 3A and FIG. 3B are schematic views of an electrically actuated material 216 in different operating states in accordance with one embodiment of the present disclosure. As shown in FIG. 3A, the first electroactive material layer 210 and the second electroactive material layer 220 (see FIG. 1) each have a first electrode 212, a second electrode 214, and an electrically actuated material 216 disposed between the first electrode 212 and the second electrode 214. For example, the first electrode 212 is a positive electrode and the second electrode 214 is a negative electrode. In the present embodiment, the first electrode 212 is disposed under the second electrode 214, and the first electrode 212 is closer than the second electrode 214 to the lower housing 120 of the button portion 100. The electrically actuated material 216 has a plurality of cations 2161 therein. As a specific example for the first electroactive material layer 210, when no voltage is applied, the first electroactive material layer 210 is in the unenergized state, the cations 2161 of the electrically actuated material 216 are evenly distributed between the first electrode 212 and the second electrode 214 such that the electrically actuated material 216 has a flat plate shape.

Referring to FIG. 3B, as a specific example of the first electroactive material layer 210, when the voltage is applied, the first electroactive material layer 210 is in the energized state, the cations 2161 of the electrically actuated material 216 are clustered on one side close to the second electrode 214 such that the electrically actuated material 216 is curved toward the first electrode 212. In some embodiments, the electrically actuated material 216 may be ionic polymer metal composites (IPMC). In some embodiments, the first electrode 212 and the second electrode 214 may be flexible metal foils that can bend together with the electrically actuated material 216.

In some embodiments, the first electroactive material layer 210 and the second electroactive material layer 220 may each include a plurality of filamentous or strip-shaped conductive polymers. When the first electroactive material layer 210 or the second electroactive material layer 220 is energized, each of the filamentous or strip-shaped conductive polymers of the first electroactive material layer 210 or the second electroactive material layer 220 is bent, so that the first electroactive material layer 210 or the second electroactive material layer 220 is bent.

The mouse 10 further includes a switch device 300. The switch device 300 is disposed, for example, on the lower housing 120. In some embodiments, the mouse 10 may be a wireless mouse, and the switch device 300 may serve as a power switch of the mouse 10. Moreover, when the switch device 300 is turned off, the first electroactive material layer 210 and the second electroactive material layer 220 is in the unenergized state, thereby causing the first electroactive material layer 210 and the second electroactive material layer 220 in the flat plate shape. When the switch device 300 is turned on, the first electroactive material layer 210 and the second electroactive material layer 220 are in the energized state, thereby causing the first electroactive material layer 210 and the second electroactive material layer 220 to change from the flat plate shape to the curved shape, and to bend toward the lower housing 120.

In other embodiments, the mouse 10 may be a wired mouse, and the switch device 300 may serve as a change-over switch for the operation state of the mouse 10. In other words, in the case that the mouse 10 is connected to the computer, when the switch device 300 is turned on, the first electroactive material layer 210 and the second electroactive material layer 220 are in the energized state, thereby causing the first electroactive material layer 210 and the second electroactive material layer 220 to bend toward the lower housing 120. When the mouse 10 is not connected to the computer or the switch device 300 is turned off, the first electroactive material layer 210 and the second electroactive material layer 220 are in the unenergized state, thereby causing the first electroactive material layer 210 and the second electroactive material layer 220 in the flat plate shape.

In some embodiments, the deformable holding portion 200 of the mouse 10 of FIG. 1 may have only singer layer of the electroactive material layer. For example, the deformable holding portion 200 of the mouse 10 of FIG. 1 may have only the first electroactive material layer 210 or the second electroactive material layer 220, and the flexible material layer 230 covers the singer layer of the electroactive material layer. When the single layer of the electroactive material layer is in the unenergized state, the single layer of the electroactive material layer has the flat plate shape. When the single layer of the electroactive material layer is in the energized state, the single layer of the electroactive material layer is changed from the flat plate shape to the curved shape, and the single layer of the electroactive material layer is bent toward the lower housing 120 of FIG. 2.

Figure 4:
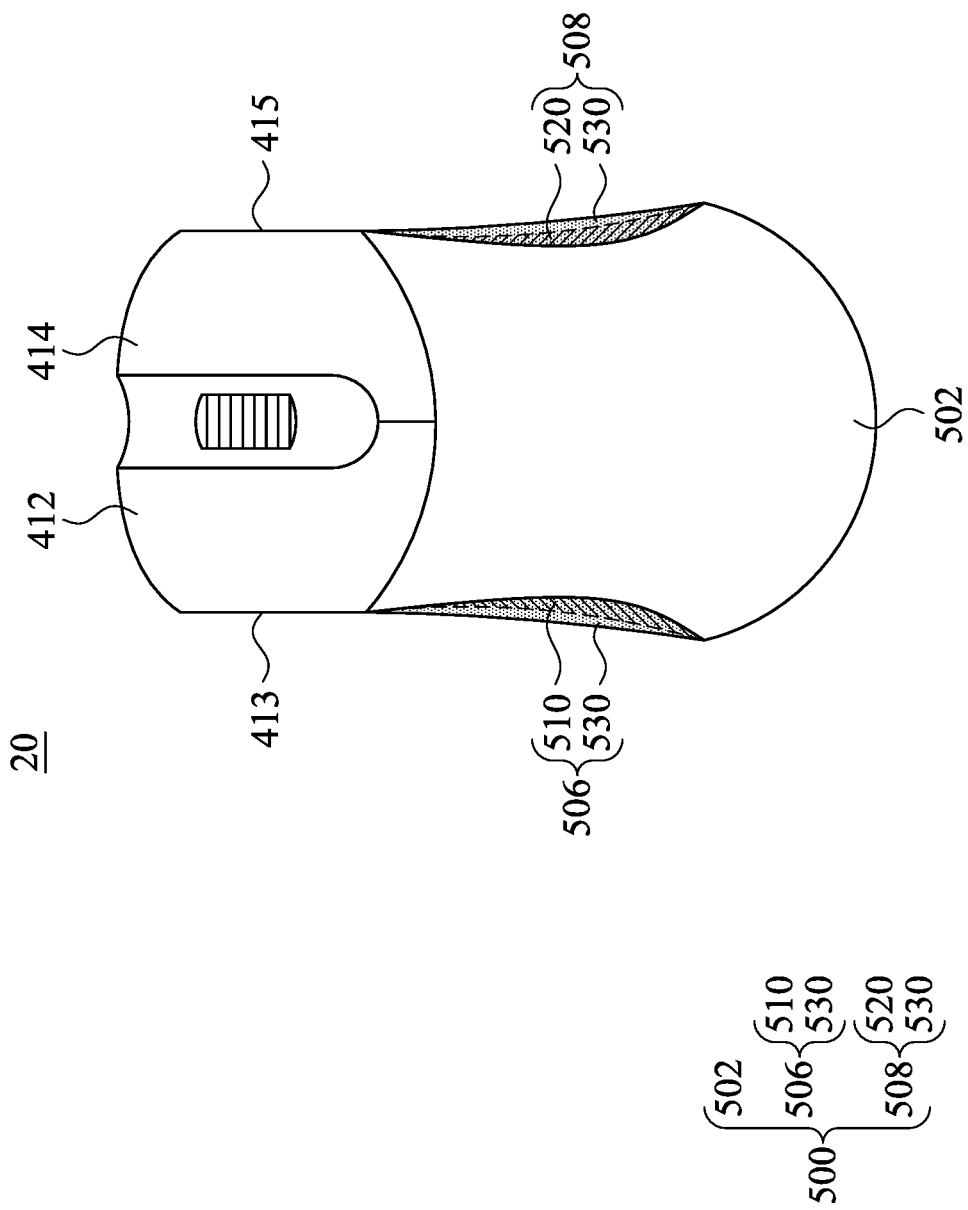
FIG. 4 is a schematic top view of a mouse in one operating state in accordance with another embodiment of the present disclosure.
Figure 5:
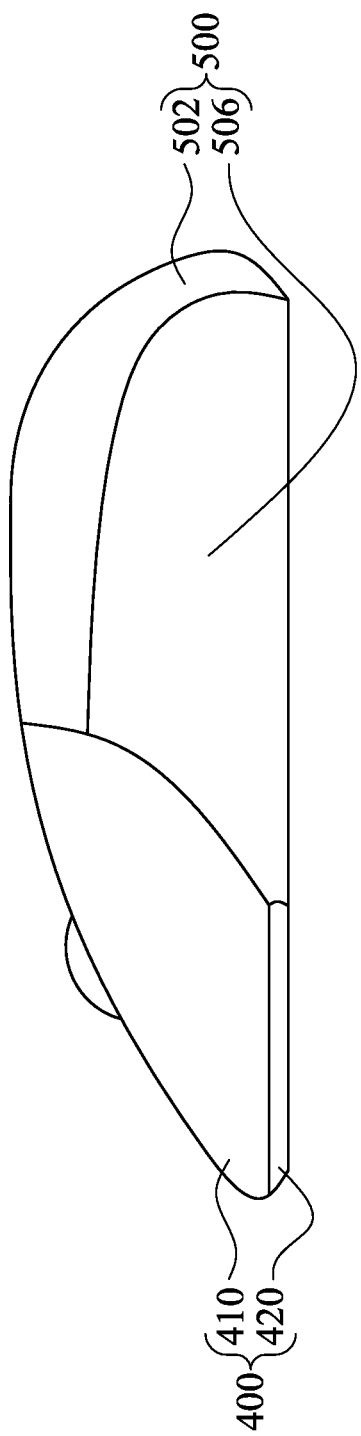
FIG. 5 is a schematic side view of the mouse in FIG. 4.
Figure 6:
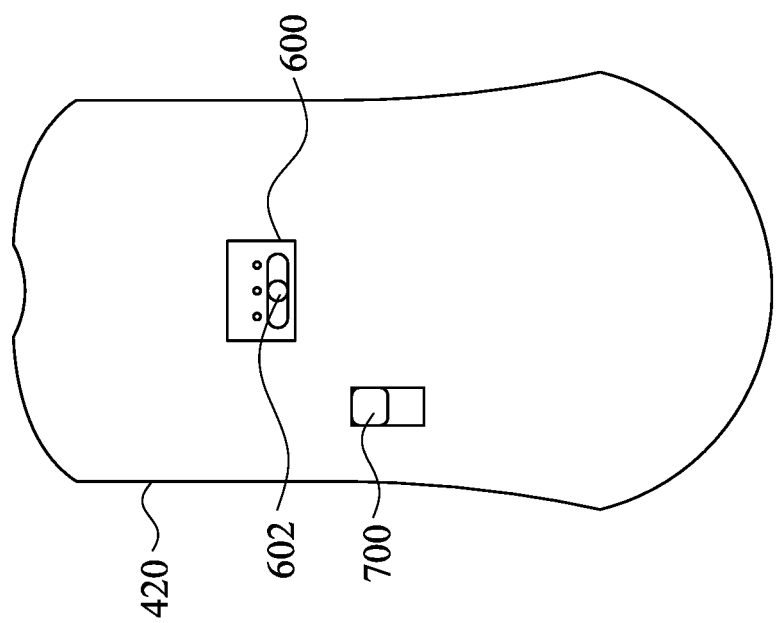
FIG. 6 is a schematic bottom view of the mouse in FIG. 4.

Referring to FIGS. 4 to 6, FIG. 4 is a schematic top view of a mouse 20 in one operating state in accordance with another embodiment of the present disclosure, FIG. 5 is a schematic side view of the mouse in FIG. 4, and FIG. 6 is a schematic bottom view of the mouse in FIG. 4. The mouse 20 includes a button portion 400 and a deformable holding portion 500. The button portion 400 has an upper housing 410 and a lower housing 420, and the upper housing 410 is assembled to the lower housing 420. The deformable holding portion 500 is connected to the button portion 400. The deformable holding portion 500 includes a first electroactive material layer 510, a second electroactive material layer 520, and a flexible material layer 530. The flexible material layer 530 covers the first electroactive material layer 510 and the second electroactive material layer 520 to achieve better using feel of the user and to protect the first the first electroactive material layer 510 and the second electroactive material layer 520.

The upper housing 410 has a first button 412 and a second button 414 arranged side by side. In the greater detail, the first button 412 and the second button 414 are respectively called "left mouse button" and "right mouse button". The first button 412 and the second button 414 can be swung toward the lower housing 420 when pressed or tapped by the user, and be restored to the original position when not pressed or tapped. In some embodiments, the first button 412 has a first outer edge 413 that is furthest from the second button 414, while the second button 414 has a second outer edge 415 that is furthest from the first button 412.

In some embodiments, the deformable holding portion 500 has a palm supporting area 502, a first finger-gripping area 506, and a second finger-gripping area 508. The palm supporting area 502 may be configured to be an area where a user can place and rest the palm and may be configured to carry the weight of the user's palm. The first finger-gripping area 506 and the second finger-gripping area 508 are respectively disposed on two sides of the palm supporting area 502. The first finger-gripping area 506 and the second finger-gripping area 508 may be configured to be two areas where a user can place the fingers separately and may be configured to move the mouse 20. The first electroactive material layer 510 is disposed in the first finger-gripping area 506, while the second electroactive material layer 520 is disposed in the second finger-gripping area 508. In some embodiments, the flexible material layer 530 respectively covers the first electroactive material layer 510 in the first finger-gripping area 506 and the second electroactive material layer 520 in the second finger-gripping area 508 so as to achieve better using feel of the user to operate the mouse 20.

In the present embodiment, the mouse 20 has different modes to comply with the needs of the users with different usage habits, and the mouse 20 further includes a change-over switch 600. The user may change the mouse 20 to different modes by adjusting the change-over switch 600. In the greater detail, the first mode of the mouse 20 is for the users who can use both hands to operate the mouse 20. The second mode of the mouse 20 is for the left-handed users. The third mode of the mouse 20 is for the right-handed users. The change-over switch 600 is disposed on the lower housing 420 of the button portion 400. In some embodiments, the change-over switch 600 may have a pushing element 602. The change-over switch 600 is selectively electrically connected to the first electroactive material layer 510, and the change-over switch 600 is selectively electrically connected to the second electroactive material layer 520. The user may change the modes of the change-over switch 600 by adjusting the pushing element 602. In the greater detail, when the change-over switch 600 is in a first mode, the first electroactive material layer 510 and the second electroactive material layer 520 are in an unenergized state. When the change-over switch 600 is in a second mode, the first electroactive material layer 510 is in an energized state, while the second electroactive material layer 520 is in the unenergized state. When the change-over switch 600 is in a third mode, the first electroactive material layer 510 is in the unenergized state, while the second electroactive material layer 520 is in the energized state. As described above, since the first electroactive material layer 510 and the second electroactive material layer 520 have characteristics of being deformed by applying the voltage. As a result, with the first electroactive material layer 510 and second electroactive material layer 520 of different energized or unenergized states, the shape deformation of the first electroactive material layer 510 and second electroactive material layer 520 can be controlled, thereby changing the profile of the first finger-gripping area 506 and the second finger-gripping area 508.

In some embodiments, the mouse 20 may optionally include a power switch 700. In the greater detail, when the mouse 20 is a wireless mouse, the power switch 700 would be electrically connected to the change-over switch 600. When the mouse 20 is a wired mouse, the mouse 20 would not have the power switch 700.

FIG. 4 illustrates a top view of the mouse 20 when the change-over switch 600 of FIG. 6 is in the first mode. In the first mode, the first electroactive material layer 510 and the second electroactive material layer 520 are in the unenergized state, so the shapes of the first electroactive material layer 510 and the second electroactive material layer 520 are not changed, and remain the original shapes. In other words, the first electroactive material layer 510 and the second electroactive material layer 520 both have flat shapes. The first electroactive material layer 510 in the first finger-gripping area 506 and the second electroactive material layer 520 in the second finger-gripping area 508 are respectively aligned with the first outer edge 413 of the first button 412 and the second outer edge 415 of the second button 414. The mouse 20 of the above-mentioned structure is in the first mode and is for the users who can use both hands to operate the mouse 20.

Figure 7:
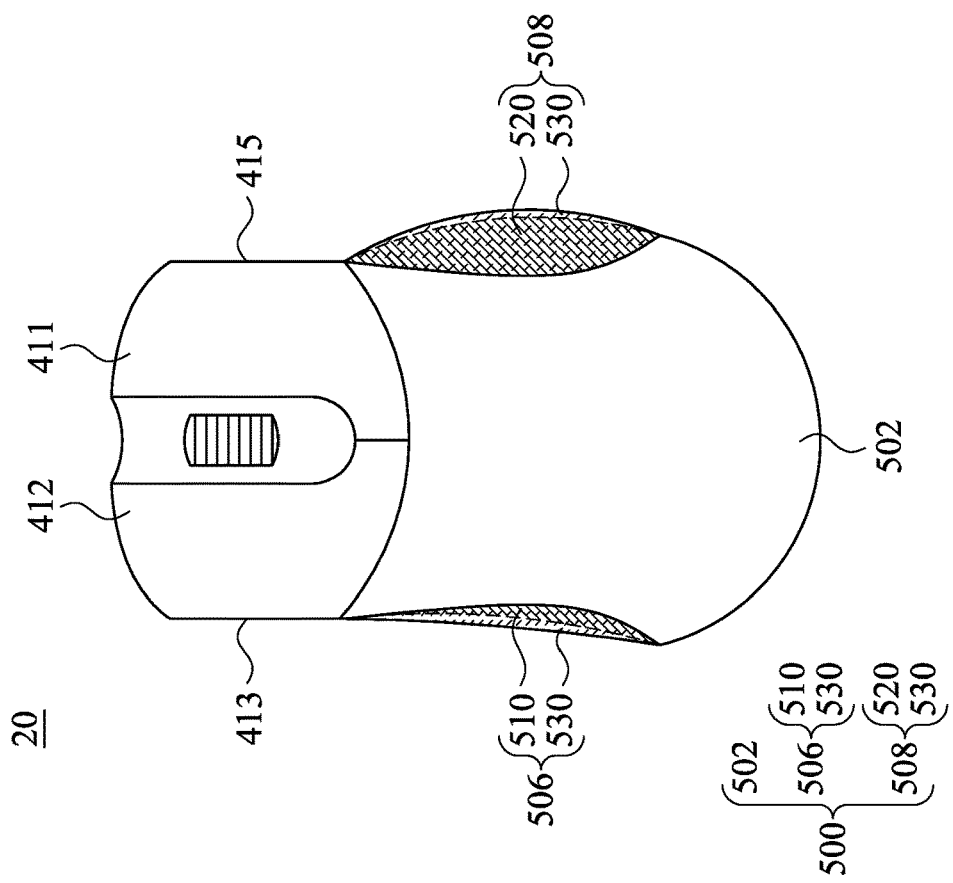
FIG. 7 is a schematic top view of the mouse in another operating state in accordance with another embodiment of the present disclosure.

Referring to FIG. 7, FIG. 7 is a schematic top view of the mouse 20 in another operating state in accordance with another embodiment of the present disclosure. When the change-over switch 600 of FIG. 6 is adjusted to the second mode, the first electroactive material layer 510 is in the energized state, so that the first electroactive material layer 510 is deformed and expanded. On the other hand, the second electroactive material layer 520 is in the unenergized state, so that the second electroactive material layer 520 is not expanded. As a result, the first electroactive material layer 510 is expanded and deformed due to energization, thereby causing the first electroactive material layer 510 in the first finger-gripping area 506 to protrude from the first outer edge 413 of the first button 412. The second electroactive material layer 520 is still aligned with the second outer edge 415 of the second button 414. In other words, the first electroactive material layer 510 protrudes toward the first outer edge 413 of the first button 412, while the second electroactive material layer 520 has the flat shape. At this time, the expansion of the first electroactive material layer 510 also causes the flexible material layer 530 to protrude toward the first outer edge 413 of the first button 412, so that the left side of the mouse 20 has a convex shape. The mouse 20 of the above-mentioned structure is in the second mode and is for the left-handed users.

Figure 8:
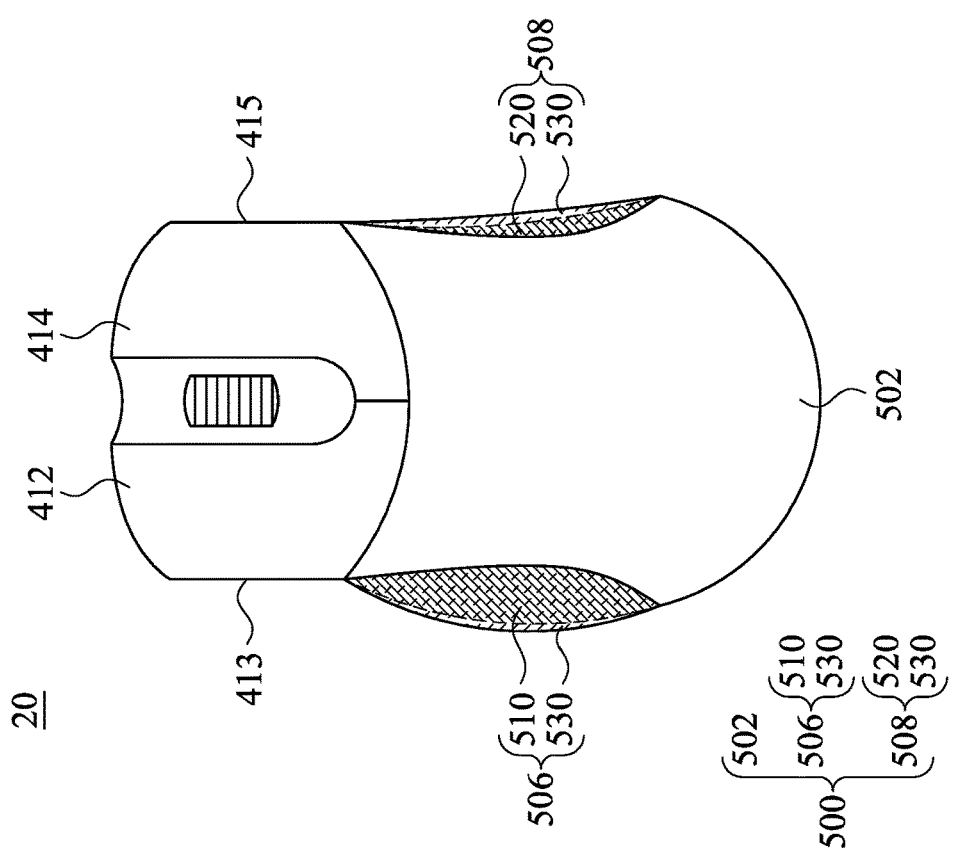
FIG. 8 is a schematic top view of the mouse in another operating state in accordance with another embodiment of the present disclosure.

Referring to FIG. 8, FIG. 8 is a schematic top view of the mouse 20 in another operating state in accordance with another embodiment of the present disclosure. When the change-over switch 600 of FIG. 6 is in the third mode, the second electroactive material layer 520 is in the energized state, so that the second electroactive material layer 520 is deformed and expanded. On the other hand, the first electroactive material layer 510 is in the unenergized state, so the first electroactive material layer 510 is not expanded. As a result, the second electroactive material layer 520 in the second finger-gripping area 508 protrudes from the second outer edge 415 of the second button 414. The first electroactive material layer 510 in the first finger-gripping area 506 is still aligned with the first outer edge 413 of the first button 412. In other words, the first electroactive material layer 510 has the flat shape, while the second electroactive material layer 520 protrudes toward the second outer edge 415 of the second button 414. At this time, the expansion of the second electroactive material layer 520 also causes the flexible material layer 530 to protrude toward the second outer edge 415 of the second button 414, so that the right side of the mouse 20 has the convex shape. The mouse 20 of the above-mentioned structure is in the third mode and is for the right-handed users.

In some embodiments, the first electroactive material layer 510 and the second electroactive material layer 520 may each include a plurality of filamentous or strip-shaped conductive polymers. When the first electroactive material layer 510 or the second electroactive material layer 520 is energized, each of the filamentous or strip-shaped conductive polymers of the first electroactive material layer 510 or the second electroactive material layer 520 is expanded, so that the first electroactive material layer 510 or the second electroactive material layer 520 is expanded.

Figure 9B:
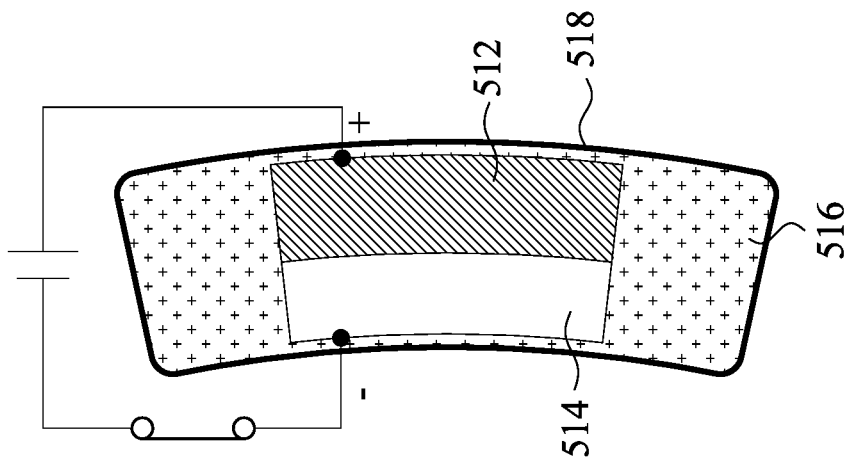
FIG. 9A and FIG. 9B are schematic views of an electroactive material in different operating states in accordance with another embodiment of the present disclosure.
Figure 9A:
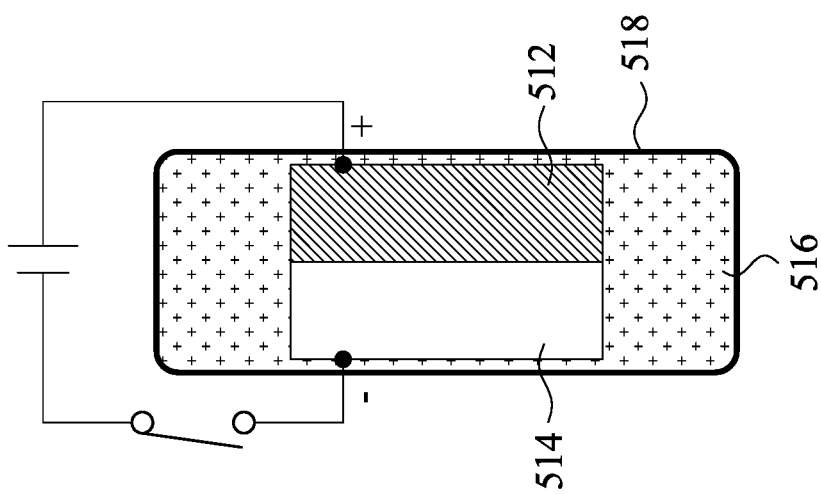

Referring to FIG. 9A and FIG. 9B, FIG. 9A and FIG. 9B are schematic views of an electroactive material 512 in different operating states in accordance with another embodiment of the present disclosure. As shown in FIG. 9A, the first electroactive material layer 510 and the second electroactive material layer 520 may each include an electroactive material (electroactive polymers; EAP) 512, a substrate 514, an external ion solution 516, and a soft material 518. FIG. 9A and FIG. 9B are exemplified by the second electroactive material layer 520 (see FIG. 8) on the right side, wherein the substrate 514 of the second electroactive material layer 520 (see FIG. 8) is closer to the palm supporting area 502 (see FIG. 8), and the electroactive material 512 is further away from the palm supporting area 502 (see FIG. 8). In other words, the substrate 514 is closer than the electroactive material 512 to the palm supporting area 502 (see FIG. 8).

The electroactive material 512 is conductive polymers such as polyaniline, polypyrrole, polyacetylene or other suitable materials. The electroactive material 512 is electroplated onto the substrate 514. The external ion solution 516 is disposed on the periphery of the electroactive material 512 and the substrate 514. The soft material 518 encloses the electroactive material 512, the substrate 514, and the external ion solution 516. When no voltage is applied, the electroactive material 512 has a flat shape.

As shown in FIG. 9B, the electroactive material 512 and the substrate 514 are respectively connected to a positive electrode and a negative electrode. When the voltage is applied, since a surface of the electroactive material 512 to which the voltage is applied is charged, the external ion solution 516 is attracted to flow into the electroactive material 512 so as to maintain the overall electrical neutrality. As a result, the electroactive material 512 is expanded due to the inflow of the external ion solution 516. Moreover, since the substrate 514 does not have an absorbing property for the external ion solution 516, the volume of the substrate 514 remains unchanged. Since the volume of the expanded electroactive material 512 is larger than the volume of the substrate 514, it tends to bend the electroactive material 512 toward the substrate 514, and the second electroactive material layer 520 is convexly expanded toward the right side.

And similarly, the substrate 514 disposed in the first electroactive material layer 510 (see FIG. 7) on the left side is closer to the palm supporting area 502, and the electroactive material 512 is further away from the palm supporting area 502. As a result, after the first electroactive material layer 510 is energized, the first electroactive material layer 510 is convexly expanded toward the left side.

In summary, the disclosure provides the mouse having the button portion and the deformable holding portion. The deformable holding portion includes the electroactive material layer and the flexible material layer. When the electroactive material layer is in the energized state, the deformable holding portion has the first shape. When the electroactive material layer is in the unenergized state, the deformable holding portion has the second shape. By using the above-mentioned mouse, the user can easily control the mouse, thereby meeting the needs of different users. Moreover, in the case of multiple usages, there is no adverse effect such as elastic fatigue, which can improve the durability of the mouse. In the present disclosure, the deformable holding portion of the mouse is deformed by electrically controlling the electroactive material layer, thereby preventing the bending force from being excessively large to decrease the risk of failure, and also avoiding the deformable holding portion being pressed from the curved shape to the flat shape when the force applied by the user when the user is using the mouse is too large.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mouse, comprising:
   a button portion comprising an upper housing and a lower housing, wherein the upper housing is assembled to the lower housing; and
   a deformable holding portion connected to the button portion and comprising:
     at least one electroactive material layer, and
     a flexible material layer covering the electroactive material layer,
   wherein when the electroactive material layer is in an energized state, the deformable holding portion has a first shape, wherein when the electroactive material layer is in an unenergized state, the deformable holding portion has a second shape, wherein when the electroactive material layer is in the energized state, the electroactive material layer is bent toward the lower housing, and wherein when the electroactive material layer is in the unenergized state, the electroactive material layer has a flat plate shape.

2. The mouse of claim 1, wherein the deformable holding portion has a palm supporting area, and the electroactive material layer is in the palm supporting area.

3. The mouse of claim 1, wherein the electroactive material layer has a first electrode, a second electrode, and an electrically actuated material disposed between the first electrode and the second electrode.

4. The mouse of claim 3, wherein the first electrode is a positive electrode, and the first electrode is closer than the second electrode to the lower housing.

5. The mouse of claim 3, wherein the electrically actuated material is an ionic polymer-metal composite (IPMC).

6. The mouse of claim 4, wherein the deformable holding portion comprises two of the electroactive material layers disposed in parallel, and one of the two electroactive material layers is closer than the other of the two electroactive material layers to the lower housing.

7. The mouse of claim 1, wherein the deformable holding portion has a palm supporting area and a finger-gripping area on one side of the palm supporting area, and the electroactive material layer is in the finger-gripping area.

8. The mouse of claim 7, wherein the electroactive material layer has an electroactive material and a substrate, and the substrate of the electroactive material layer is closer than the electroactive material to the palm supporting area.

* * * * *